United States Patent
Ikeya et al.

(10) Patent No.: US 12,308,724 B2
(45) Date of Patent: May 20, 2025

(54) INVERTER INTEGRATED GAS SUPPLY DEVICE WITH SEALING MEMBER FOR MOTOR CONNECTOR

(71) Applicant: IHI Corporation, Tokyo (JP)

(72) Inventors: Nobuyuki Ikeya, Tokyo (JP); Yuji Sasaki, Tokyo (JP); Masaya Taniguchi, Tokyo (JP); Gen Kuwata, Tokyo (JP); Satoru Ohashi, Tokyo (JP)

(*) Notice: Subject to any disclaimer, the term of this patent is extended or adjusted under 35 U.S.C. 154(b) by 822 days.

(21) Appl. No.: 17/481,311

(22) Filed: Sep. 22, 2021

(65) Prior Publication Data
US 2022/0006355 A1 Jan. 6, 2022

Related U.S. Application Data (63) Continuation of application No. PCT/JP2020/011851, filed on Mar. 17, 2020.

(30) Foreign Application Priority Data

Mar. 27, 2019 (JP) ................. 2019-059957

(51) Int. Cl.
*H02K 5/10* (2006.01)
*H02K 5/20* (2006.01)
(Continued)

(52) U.S. Cl.
CPC ............. *H02K 5/10* (2013.01); *H02K 5/225* (2013.01); *H02K 11/33* (2016.01); *H02K 5/203* (2021.01); *H02K 9/197* (2013.01)

(58) Field of Classification Search
CPC ............ H02K 5/10; H02K 5/22; H02K 5/225; H02K 11/30; H02K 11/33; H01R 3/6315
See application file for complete search history.

(56) References Cited

U.S. PATENT DOCUMENTS

| | | | |
|---|---|---|---|
| 6,155,857 A | 12/2000 | Kato et al. | |
| 11,929,651 B2* | 3/2024 | Ikeya | H01R 13/631 |

(Continued)

FOREIGN PATENT DOCUMENTS

| | | |
|---|---|---|
| CN | 102449858 | 5/2012 |
| JP | H6-257695 | 9/1994 |

(Continued)

OTHER PUBLICATIONS

Kamisaka, machine translation of jp2017223151, Dec. 2017 (Year: 2017).*

(Continued)

*Primary Examiner* — Eric Johnson
(74) *Attorney, Agent, or Firm* — SOEI PATENT & LAW FIRM (57) ABSTRACT

An inverter integrated gas supply device includes an electric motor and an inverter. The electric motor has a motor-side connection part that is configured to receive a drive current. The inverter has an inverter-side connection part that is connected to the motor-side connection part, and configured to supply the drive current to the motor-side connection part. The motor-side connection part includes a motor-side connector housing fixed to a motor case, a motor connector that is configured to receive the drive current, and a sealing member configured to seal a gap between the motor-side connector housing and the motor connector.

18 Claims, 5 Drawing Sheets

(51) Int. Cl.
  *H02K 5/22* (2006.01)
  *H02K 9/197* (2006.01)
  *H02K 11/33* (2016.01)

(56) References Cited

U.S. PATENT DOCUMENTS

| | | | | |
|---|---|---|---|---|
| 2007/0218747 | A1* | 9/2007 | Takehara | H01R 13/5219 |
| | | | | 439/382 |
| 2009/0256437 | A1* | 10/2009 | Miura | H02K 5/225 |
| | | | | 903/906 |
| 2012/0015546 | A1* | 1/2012 | Yamaguchi | H01R 13/05 |
| | | | | 439/625 |
| 2012/0040553 | A1 | 2/2012 | Tashiro | |
| 2012/0319513 | A1* | 12/2012 | Okamoto | H02K 3/28 |
| | | | | 310/71 |
| 2014/0199894 | A1 | 7/2014 | Kusamaki et al. | |
| 2017/0179786 | A1* | 6/2017 | Goto | H02P 27/06 |
| 2018/0351284 | A1* | 12/2018 | Miyazawa | H01R 13/518 |
| 2018/0358748 | A1 | 12/2018 | Yamanashi et al. | |
| 2019/0120125 | A1 | 4/2019 | Izuka et al. | |
| 2019/0345956 | A1 | 11/2019 | Izuka et al. | |

FOREIGN PATENT DOCUMENTS

| | | | |
|---|---|---|---|
| JP | H8-065945 | | 3/1996 |
| JP | H9-245887 | | 9/1997 |
| JP | 2005-020881 | | 1/2005 |
| JP | 2005-333748 | | 12/2005 |
| JP | 2008-082279 | | 4/2008 |
| JP | 2009070656 | A * | 4/2009 |
| JP | 2011-009092 | | 1/2011 |
| JP | 2011-034825 | | 2/2011 |
| JP | 2012-005175 | | 1/2012 |
| JP | 2014-138446 | | 7/2014 |
| JP | 2015-115969 | | 6/2015 |
| JP | 2015-183668 | | 10/2015 |
| JP | 2016-024928 | | 2/2016 |
| JP | 2016-092933 | | 5/2016 |
| JP | 2017-223151 | | 12/2017 |
| JP | 2019-003743 | | 1/2019 |
| WO | 2011/016272 | | 2/2011 |
| WO | 2018/012104 | | 1/2018 |
| WO | 2018/139497 | | 8/2018 |

OTHER PUBLICATIONS

Nashida, machine translation of jp2009070656, Apr. 2009 (Year: 2009).*
Sato, machine translation of jp2012005175, Jan. 2012 (Year: 2012).*
International Preliminary Report on Patentability with Written Opinion dated Oct. 7, 2021 for PCT/JP2020/011851.
International Search Report dated Jun. 9, 2020 for PCT/JP2020/011851.
International Search Report dated Jun. 9, 2020 for PCT/JP2020/011852.
Soei Patent and Law Firm, Statement of Related Matters, dated Sep. 30, 2021.
International Preliminary Report on Patentability with Written Opinion dated Oct. 7, 2021 for PCT/JP2020/011852.

* cited by examiner

INVERTER INTEGRATED GAS SUPPLY DEVICE WITH SEALING MEMBER FOR MOTOR CONNECTOR

CROSS-REFERENCE TO RELATED APPLICATIONS

This application is a continuation application of PCT Application No. PCT/JP2020/011851, filed on Mar. 17, 2020, which claims the benefit of priority from Japanese Patent Application No. 2019-059957, filed on Mar. 27, 2019, the entire contents of which are incorporated herein by reference.

BACKGROUND

Japanese Unexamined Patent Publications No. 2005-20881, H08-65945, and 2016-92933 disclose a device having an electric motor and an inverter. Japanese Unexamined Patent Publication No. 2005-20881 discloses a cooling structure. The cooling structure of Japanese Unexamined Patent Publication No. 2005-20881 cools the electric motor and the inverter. Japanese Unexamined Patent Publication No. H08-65945 discloses a device that eliminates the pressure difference between the inside and outside of a motor case. The device of Japanese Unexamined Patent Publication No. H08-65945 also prevents the intrusion of water into the interior of the motor case. Japanese Unexamined Patent Publication No. 2016-92933 discloses a configuration that removably connects an inverter housing part to a motor housing part.

SUMMARY

An example inverter integrated gas supply device includes an electric motor having a motor casing and driving a fluid machine that discharges air, an inverter having an inverter casing and supplying a drive current for controlling the number of rotations of the electric motor to the electric motor, a motor-side connection part attached to the motor casing and receiving the drive current, and an inverter-side connection part attached to the inverter casing, connected to the motor-side connection part, and supplying the drive current to the motor-side connection part. The motor-side connection part includes a motor-side connector housing fixed to the motor casing, a motor connector disposed inside the motor-side connector housing and configured to receive the drive current from the inverter-side connection part, and a first sealing member sandwiched between the motor-side connector housing and the motor connector.

DETAILED DESCRIPTION

An example inverter integrated gas supply device includes an electric motor having a motor casing and driving a fluid machine that discharges air, an inverter having an inverter casing and supplying a drive current for controlling the number of rotations of the electric motor to the electric motor, a motor-side connection part attached to the motor casing and receiving the drive current, and an inverter-side connection part attached to the inverter casing, connected to the motor-side connection part, and supplying the drive current to the motor-side connection part. The motor-side connection part includes a motor-side connector housing fixed to the motor casing, a motor connector disposed inside the motor-side connector housing and configured to receive the drive current from the inverter-side connection part, and a first sealing member sandwiched between the motor-side connector housing and the motor connector.

The inverter may be electrically connected to the electric motor by the motor-side connection part and the inverter-side connection part. The motor-side connection part includes the first sealing member. The first sealing member is sandwiched between the motor connector and the motor-side connector housing. The first sealing member maintains the water-tightness of the motor-side connection part. That is, the first sealing member inhibits the movement of water through the motor-side connection part. The intrusion of water into the interior of the inverter is thus suppressed.

In some examples, the inverter integrated gas supply device may further include a second sealing member sandwiched between the motor casing and the motor-side connector housing. The second sealing member maintains the water-tightness between the motor casing and the motor-side connector housing. That is, the second sealing member inhibits the movement of water through between the motor casing and the motor-side connection part. The intrusion of water into the interior of the inverter is thus further suppressed.

In some examples, the inverter integrated gas supply device may further include a third sealing member sandwiched between the motor casing and the inverter casing. The third sealing member maintains the water-tightness between the motor casing and the inverter casing. That is, the third sealing member inhibits the movement of water through between the motor casing and the inverter casing. The intrusion of water into the interior of the inverter is thus even further suppressed.

In some examples, the inverter-side connection part may include an inverter-side connector housing fixed to the inverter casing, and an inverter connector disposed inside the inverter-side connector housing and configured to supply the drive current to the motor connector. The position of the motor connector relative to the motor-side connector housing may be fixed. The position of the inverter connector relative to the inverter-side connector housing may be variable. In this configuration, the relative position of the inverter connector is variable. As a result, the inverter connector is movable relative to the inverter-side connector housing according to the position of the motor connector. Thus, the allowable misalignment of the inverter connector relative to the motor connector with the inverter casing fixed to the motor casing can be increased.

Hereinafter, with reference to the drawings, the same elements or similar elements having the same function are denoted by the same reference numerals, and redundant description will be omitted.

Figure 1:
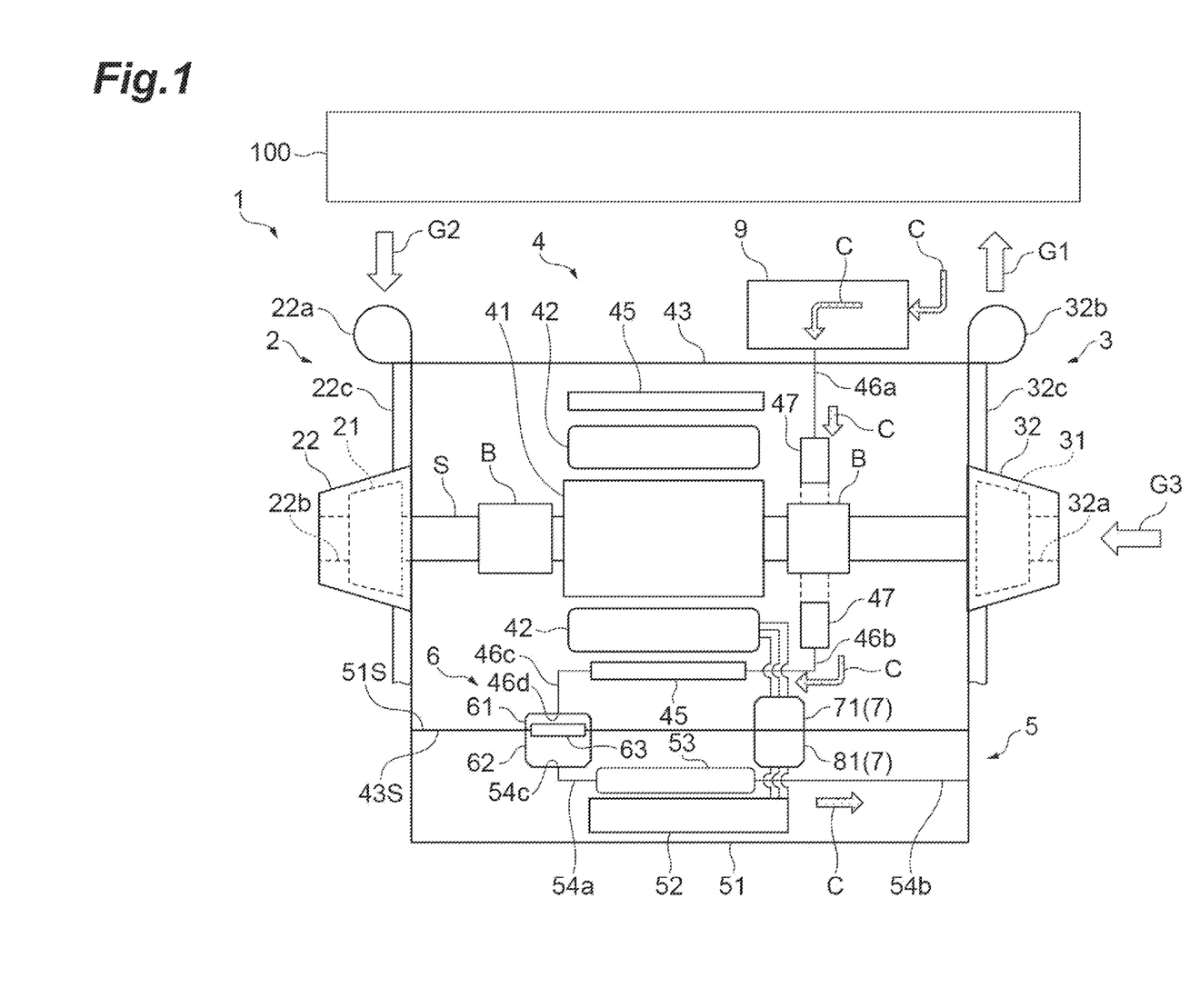
FIG. 1 is a diagram illustrating an example electric turbocharger.

An example electric turbocharger 1 (inverter integrated gas supply device) illustrated in FIG. 1 will be described. The electric turbocharger 1 may be a centrifugal compressor that is applied, for example, to a fuel cell system 100. The fuel cell system 100 may be, for example, a polymer electrolyte fuel cell (PEFC) system, a phosphoric acid fuel cell (PAFC) system, or other types of fuel cell systems and the like.

The electric turbocharger 1 has a turbine 2 (fluid machine), a compressor 3 (fluid machine), an electric motor 4, and an inverter 5. The turbine 2, the compressor 3, and the electric motor 4 are connected to one another by a rotating shaft S. The turbine 2 is mounted on a first end of the rotating shaft S. The compressor 3 is mounted on a second end of the rotating shaft S. The electric motor 4 is provided between the turbine 2 and the compressor 3.

Air G1 is gas compressed by the compressor 3. The air G1 is supplied to the fuel cell system 100 connected to the electric turbocharger 1. The fuel cell system 100 causes a chemical reaction between fuel and an oxidizing agent. This chemical reaction generates air G2 containing water vapor and electricity. The fuel cell system 100 supplies the air G2 to the turbine 2.

The fuel cell system 100 discharges the air G2 having a high temperature. The electric turbocharger 1 drives the turbine 2 using the air G2. The driving of the turbine 2 causes the compressor 3 to be driven. The compressor 3 supplies the air G1 to the fuel cell system 100. In some examples, a large majority of the driving force of the compressor 3 may be supplied by the electric motor 4. That is, the electric turbocharger 1 may be driven mostly by the electric motor.

The fuel cell system 100 and the electric turbocharger 1 are mounted, for example, on a vehicle such as an electric vehicle. In some examples, electric power output from the fuel cell system 100 may be supplied to the electric motor 4 of the electric turbocharger 1. Alternatively, electric power may be supplied to the electric motor 4 of the electric turbocharger 1 by a power supply other than the fuel cell system 100.

The electric turbocharger 1 will be described in further detail below.

The turbine 2 has a turbine impeller 21 and a turbine housing 22. The turbine impeller 21 is mounted on the first end of the rotating shaft S. The compressor 3 has a compressor impeller 31 and a compressor housing 32. The compressor impeller 31 is mounted on the second end of the rotating shaft S. In some examples, a nozzle may be disposed on the turbine 2 side, and a diffuser may be disposed on the compressor 3 side.

A motor case 43 (motor casing) is provided between the turbine housing 22 and the compressor housing 32. The rotating shaft S is rotatably supported by the motor case 43 via bearings B.

The turbine housing 22 has an inlet part 22a and a discharge part 22b. The fuel cell system 100 discharges the air G2 containing water vapor. The air G2 flows into the turbine housing 22 from the inlet part 22a. The air G2 flown in passes through a flow channel 22c, and is then supplied to the turbine impeller 21. The turbine impeller 21 is, for example, a radial turbine. The turbine impeller 21 converts the fluid energy of the supplied air G2 into rotational energy. The air G2 is then discharged from the discharge part 22b.

The compressor housing 32 has an inlet part 32a and a discharge part 32b. When the turbine impeller 21 rotates, the rotating shaft S and the compressor impeller 31 rotate. The rotating compressor impeller 31 draws in air G3 from the inlet part 32a. The compressor impeller 31 compresses the air G3. The compressor impeller 31 then discharges the compressed air G1. The air G1 passes through a flow channel 32c, and is then discharged from the discharge part 32b. The air G1 discharged from the discharge part 32b is supplied to the fuel cell system 100. In some examples, the gas to be compressed by the compressor 3 is not limited to air.

The electric motor 4 is, for example, a brushless AC motor. The electric motor 4 has a rotor 41 which is a rotating component and a stator 42 which is a stationary component. The rotor 41 includes one or a plurality of magnets. The rotor 41 fixed to the rotating shaft S is rotatable about an axis together with the rotating shaft S. The rotor 41 is disposed in an axial center portion of the rotating shaft S. The "center portion" refers to a generally central position in the axis direction. That is, it is not center in the strict sense. For example, the rotor 41 may be disposed closer to the turbine 2. Alternatively, the rotor 41 may be disposed closer to the compressor 3. The stator 42 has a plurality of coils and an iron core. The stator 42 surrounds the rotor 41 in a circumferential direction of the rotating shaft S. The stator 42 generates a magnetic field around the rotating shaft S. The stator 42 causes the rotor 41 to rotate in cooperation with the rotor 41.

The inverter 5 supplies a drive current for controlling the number of rotations of the electric motor 4 to the electric motor 4. The inverter 5 has an inverter case 51 (inverter casing) and an inverter circuit 52.

The electric turbocharger 1 has a cooling system. The cooling system is for the electric motor 4 and the inverter 5. The electric turbocharger 1 has a heat exchanger 9. In some examples, the heat exchanger 9 may be omitted from the electric turbocharger 1 depending on the mode of use. The electric motor 4 has flow channels 46a, 46b, 46c, and cooling parts 45, 47. The cooling part 45 cools the stator 42. The cooling part 47 cools the bearing B. The flow channel 46a is connected to the heat exchanger 9. The flow channel 46a receives cooling water C from the heat exchanger 9. The flow channel 46a then supplies the cooling water C to the cooling part 47. The flow channel 46b connects the cooling part 45 to the cooling part 47. The flow channel 46b receives the cooling water C that flows out from the cooling part 47. The flow channel 46b supplies the received cooling water C to the cooling part 45. The flow channel 46c connects the cooling part 45 to a cooling water connection structure 6 described later. The flow channel 46c receives the cooling water C that flows out from the cooling part 45. The flow channel 46c supplies the received cooling water C to the cooling water connection structure 6.

The inverter 5 has a cooling part 53 and flow channels 54a, 54b. The cooling part 53 cools the inverter circuit 52. The flow channel 54a connects the cooling water connection structure 6 to the cooling part 53. The flow channel 54a receives the cooling water C that flows out from the cooling water connection structure 6. The flow channel 54a supplies the received cooling water C to the cooling part 53. The flow channel 54b is connected to the cooling part 53. The flow channel 54b receives the cooling water C that flows out from the cooling part 53. The flow channel 54b discharges the received cooling water C outside the inverter case 51.

The connection configuration between the electric motor 4 and the inverter 5 will be described in further detail below.

The inverter case 51 is fixed to the motor case 43 by a stud bolt or the like. The electric turbocharger 1 has the cooling water connection structure 6 and an electric connection structure 7. The cooling water connection structure 6 supplies and receives the cooling water C which is a coolant. The electric connection structure 7 supplies and receives the drive current. These connection structures do not use connection members such as pipes or wires to connect the inverter 5 to the electric motor 4. The cooling water connection structure 6 and the electric connection structure 7 are formed by attaching the inverter case 51 to the motor case 43.

<Cooling Water Connection Structure>

The cooling water connection structure 6 has an interface part 61. The interface part 61 is formed on a connection surface 43S of the motor case 43 relative to the inverter case 51. The interface part 61 is flat. The interface part 61 protrudes slightly from the connection surface 43S. The interface part 61 has an opening 46*d* which is an end of the flow channel 46*c* formed therein. Thus, the cooling water C that has flown through the interior of the electric motor 4 is discharged from the opening 46*d*.

The cooling water connection structure 6 has an interface part 62. The interface part 62 is formed on a connection surface 51S of the inverter case 51 relative to the motor case 43. The interface part 62 is flat. The interface part 62 is recessed slightly from the connection surface 51S. The interface part 62 has an opening 54*c* which is an end of the flow channel 54*a* formed therein.

The cooling water connection structure 6 has a packing 63 (packing material). The packing 63 is sandwiched between the interface part 61 and the interface part 62. The packing 63 surrounds the opening 54*c* of the flow channel 54*a*. The packing 63 is disposed in a groove formed in the interface part 62.

When the inverter case 51 is attached to the motor case 43, the interface part 62 of the inverter case 51 fits into the interface part 61 of the motor case 43. The interface part 61 compresses the packing 63 slightly. As a result, watertightness between the interface parts 61, 62 is ensured by the compressed packing 63. Accordingly, the cooling water C can be supplied and received between the electric motor 4 and the inverter 5. Such a connection structure can connect the inverter case 51 to the motor case 43 without the need of connection components such as pipes in order to facilitate an attachment of the inverter 5 to the electric motor 4. By omitting connection components, the manufacturing cost of the electric turbocharger 1 can also be reduced.

<Electric Connection Structure>

Figure 2:
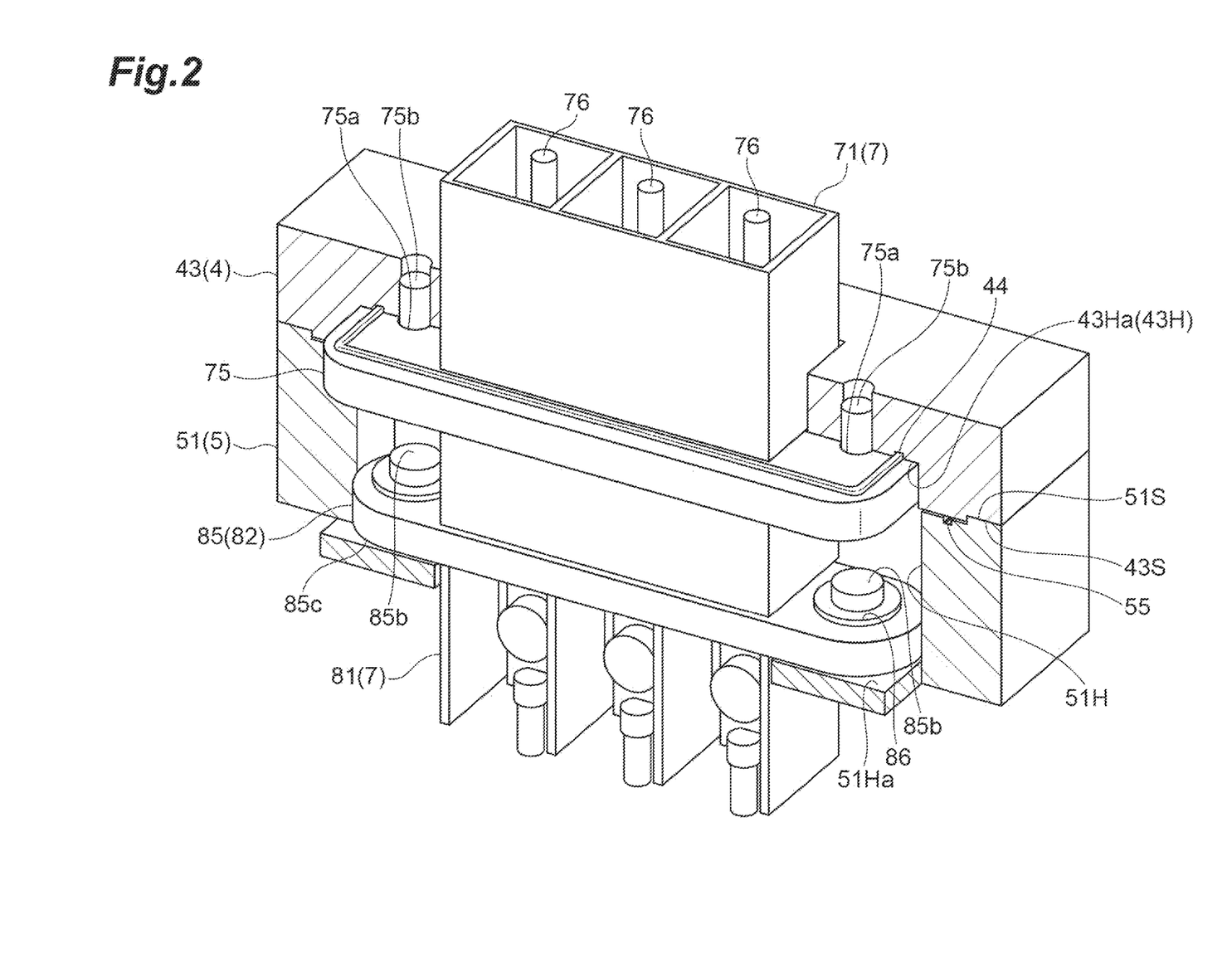
FIG. 2 is a perspective view illustrating an example structure for ensuring electrical connection.

As shown in FIG. 2, the electric connection structure 7 has a motor-side connection part 71 and an inverter-side connection part 81. The motor-side connection part 71 is fixed to the motor case 43. Similarly, the inverter-side connection part 81 is fixed to the inverter case 51. The inverter 5 is electrically connected to the electric motor 4 by inserting the inverter-side connection part 81 into the motor-side connection part 71. This structure ensures the connection between the motor-side connection part 71 and the inverter-side connection part 81 by the motor case 43 and the inverter case 51 being connected to each other. The inverter case 51 can be connected to the motor case 43 without the need of connection components such as cables in order to facilitate the attachment of the inverter 5 to the electric motor 4. By omitting connection components, the manufacturing cost of the electric turbocharger 1 can be further reduced.

Figure 3:
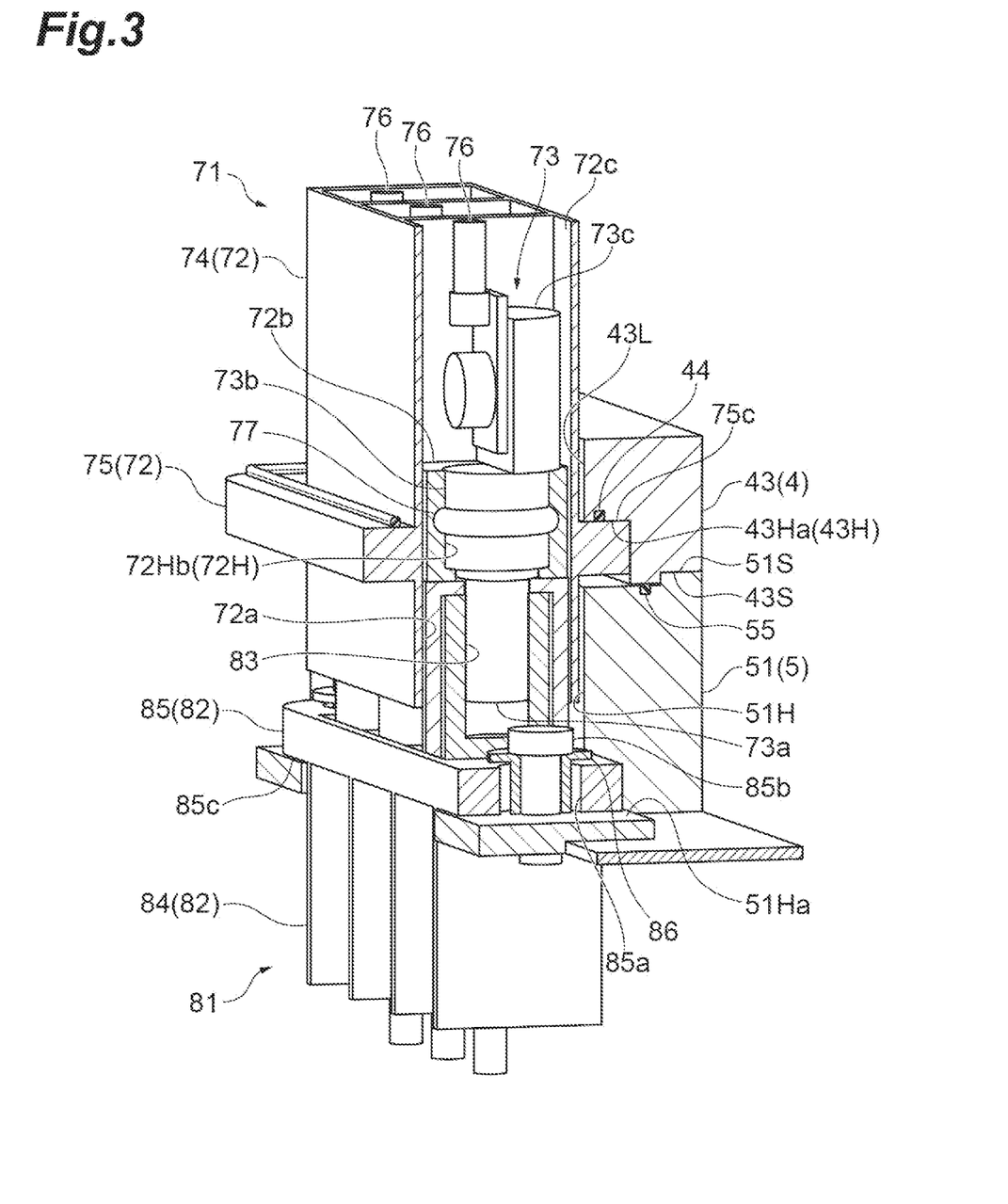
FIG. 3 is a perspective cross-sectional view illustrating the inside of the structure of FIG. 2.

As shown in FIG. 3, the motor-side connection part 71 has a pin housing 72 (motor-side connector housing) and a plurality of pins 73 (motor connectors). The pin housing 72 has a body 74 and a flange 75. The body 74 houses the plurality of pins 73. In some examples, the number of the pins 73 may be selected as appropriate according to the specifications. FIG. 3 illustrates a configuration having three pins 73 as an example. The flange 75 has a pair of bolt holes 75*a* (see FIG. 2). The pin housing 72 is fixed to the motor case 43 by bolts 75*b* inserted through the bolt holes 75*a*. Each pin 73 has a pin distal end 73*a*, a large diameter part 73*b*, and a cable connection end 73*c*. The pin distal end 73*a*, the large diameter part 73*b*, and the cable connection end 73*c* may be integrally molded using a conductive metal material.

The pin housing 72 includes a distal end part 72*a* closer to the inverter 5, an intermediate part 72*b*, and a base end part 72*c* closer to the electric motor 4. The inverter-side connection part 81 is inserted into the distal end part 72*a*. Cables 76 connected to the pins 73 extend from the base end part 72*c*. The distal end part 72*a* is hollow. The intermediate part 72*b* is solid. The intermediate part 72*b* holds the pins 73. The intermediate part 72*b* separates the distal end part 72*a* from the base end part 72*c*. The cable connection end 73*c* is disposed in the base end part 72*c*. The space in which the cable connection end 73*c* is disposed is filled with a resin material or the like. That is, the base end part 72*c* is also solid. The illustration of the component that fills the base end part 72*c* is omitted in FIG. 3.

The pin distal end 73*a* is inserted into a receptacle 83 of the inverter-side connection part 81 described later. The pin distal end 73*a* is electrically connected to the receptacle 83. The large diameter part 73*b* has an outer diameter that is larger than the outer diameter of the pin distal end 73*a*. A loop-shaped packing 77 (first sealing member) is mounted on the large diameter part 73*b*. The packing 77 is pushed against an inner wall surface 72Hb of a hole 72H formed in the intermediate part 72*b*. The packing 77 is compressed as a result. This inhibits movement of gas and liquid between the distal end part 72*a* and the base end part 72*c*. That is, the distal end part 72*a* and the base end part 72*c* do not communicate with each other. The configuration illustrated in FIG. 3 may be referred to as a first watertight structure of the electric turbocharger 1.

The pin 73 is attached to the pin housing 72 via the packing 77. The packing 77 is formed of an elastic resin material. The relative positional relationship between the pin 73 and the pin housing 72 can thus vary depending on the elasticity of the packing 77. That is, the pin 73 is attached to the pin housing 72 with a certain amount of flexibility. This allows small relative changes between the pin 73 and the pin housing 72 by the elasticity of the packing 77 when a force that causes the relative changes is applied, for example, by vibrations acting on the electric turbocharger 1. Thus, unintended stress on the pin 73 and the pin housing 72 caused by vibrations acting on the electric turbocharger 1 or vibrations generated by the electric turbocharger 1 can be suppressed.

The inverter-side connection part 81 is inserted into a distal end of the pin housing 72. The inverter-side connection part 81 has a receptacle housing 82 (inverter-side connector housing) and three receptacles 83 (inverter connectors). The receptacles 83 receive the pins 73 of the motor-side connection part 71. The receptacle housing 82 has a body 84 and a flange 85. The body 84 houses the three receptacles 83. The flange 85 has a pair of through holes 85*a*. The receptacle housing 82 is fixed to the inverter case 51 by bolts 85*b* (fastening members) inserted through the through holes 85*a*. The inverter case 51 has a hole 51H (see FIG. 2) formed in the connection surface 51S. The shape of the hole 51H corresponds to the shape of the flange 85. For example, the shape of the hole 51H is the shape of the flange 85 that takes into consideration the amount of movement of sockets 86. A rear surface 85*c* of the flange 85 contacts a bottom surface 51Ha of the hole 51H.

The position of the receptacle housing 82 relative to the inverter case 51 is variable. In other words, the receptacle housing 82 is allowed to move slightly on the bottom surface 51Ha. When the inverter case 51 is attached to the motor case 43, the positions of the receptacles 83 of the inverter-side connection part 81 may not precisely match the positions of the pin distal ends 73a of the motor-side connection part 71. In such a case, the pin distal ends 73a may biasingly contact inner circumferential surfaces of the receptacles 83. If the misalignment is large, the pin distal ends 73a may not be able to be inserted into the receptacles 83. Thus, to allow for this misalignment, the receptacle housing 82 holding the receptacles 83 has a configuration to be movable relative to the inverter case 51.

Figure 4:
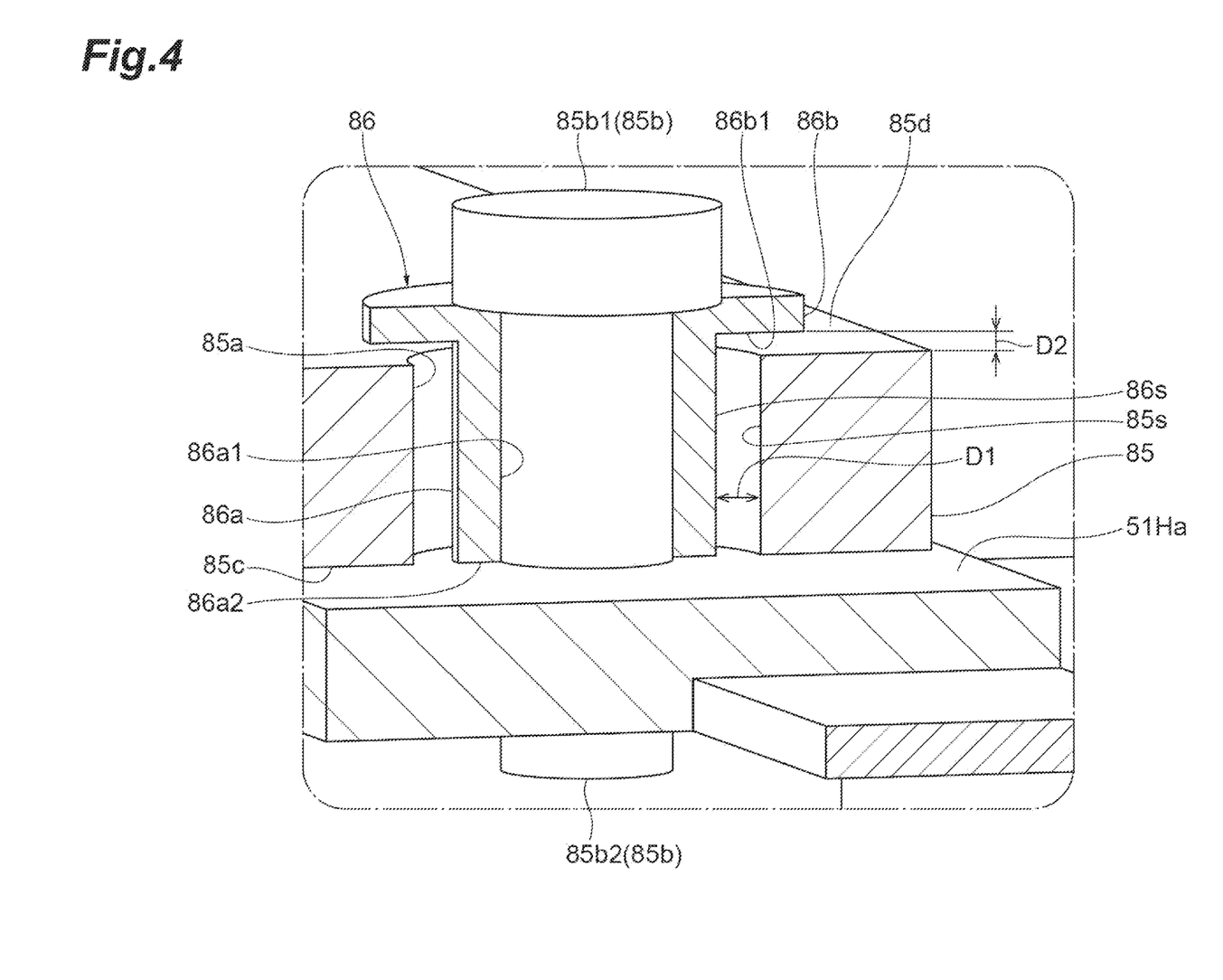
FIG. 4 is an enlarged perspective view illustrating an attachment structure of a receptacle housing of an inverter-side connection part in the structure of FIG. 2.

FIG. 4 illustrates an example structure. The socket 86 is inserted into the through hole 85a of the flange 85. The socket 86 has a cylindrical body 86a and a disk-shaped flange 86b. The flange 86b is formed on an upper end of the body 86a. The body 86a has an outer diameter that is smaller than an inner diameter of the through hole 85a. Accordingly, a gap D1 is formed between an outer circumferential surface 86s of the body 86a and an inner circumferential surface 85s of the through hole 85a. A hole 86a1 of the body 86a may have an inner diameter that is the same as an outer diameter of a shaft part 85b2 of the bolt 85b. Alternatively, the hole 86a1 of the body 86a may have an inner diameter that is slightly larger than the outer diameter of the shaft part 85b2 of the bolt 85b. A lower end 86a2 of the body 86a abuts against the bottom surface 51Ha of the inverter case 51. The bolt 85b is inserted into the hole 86a1 of the body 86a. The bolt 85b is then screwed into a screw hole formed in the bottom surface 51Ha. As a result, the socket 86 is fixed to the inverter case 51. The upper end of the body 86a is separated from a main surface 85d of the flange 85. A gap D2 is thus also formed between a rear surface 86b1 of the socket 86 formed on the upper end and the main surface 85d of the flange 85 of the receptacle housing 82. The receptacle housing 82 is allowed to move along the bottom surface 51Ha due to the gaps D1, D2. The distance through which the receptacle housing 82 is allowed to move depends on the length of the gap D1.

Figure 5:
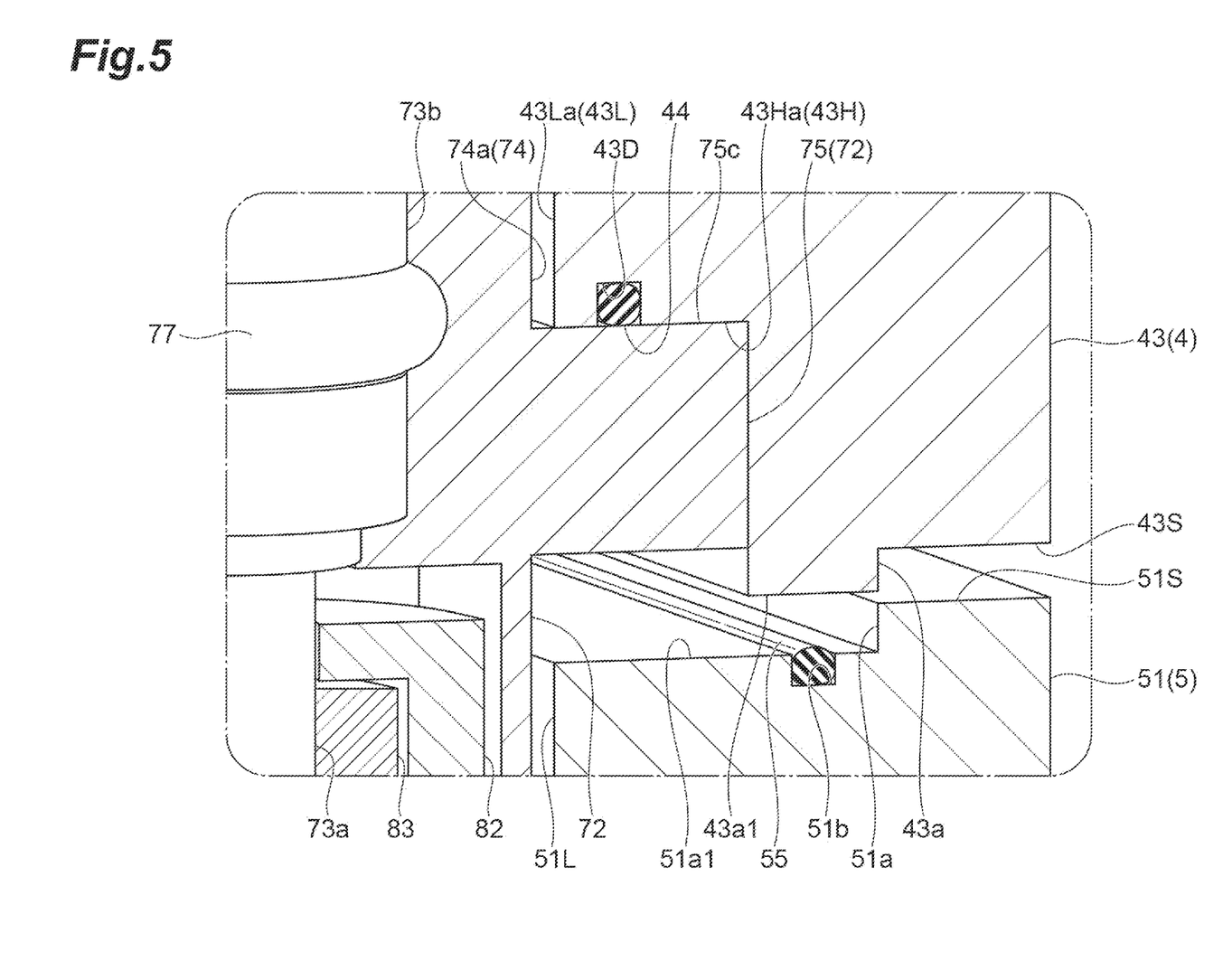
FIG. 5 is an enlarged perspective view illustrating an example watertight structure.

As described above, the electric turbocharger 1 has the first watertight structure due to the packings 77. The electric turbocharger 1 may also have a second watertight structure and a third watertight structure shown in FIG. 5. For ease of understanding, FIG. 5 illustrates the inverter case 51 slightly separated from the motor case 43.

The second watertight structure ensures water-tightness between the motor case 43 and the pin housing 72. The motor case 43 has a hole 43H in the connection surface 43S. The hole 43H corresponds to the shape of the flange 75. A groove 43D is formed in a bottom surface 43Ha of the hole 43H. The groove 43D surrounds a hole 43L formed in the motor case 43. The body 74 of the pin housing 72 is inserted into the hole 43L. A loop-shaped packing 44 (second sealing member) is disposed in the groove 43D. A main surface 75c of the flange 75 faces the bottom surface 43Ha of the hole 43H. When the flange 75 is fitted into the hole 43H, the main surface 75c of the flange 75 compresses the packing 44. The second watertight structure inhibits the movement of gas and liquid through a gap between a side surface 74a of the body 74 of the pin housing 72 and an inner wall surface 43La of the hole 43L formed in the motor case 43. The second watertight structure also inhibits the movement of gas and liquid through between the bottom surface 43Ha of the hole 43H and the main surface 75c of the flange 75.

The third watertight structure ensures water-tightness between the motor case 43 and the inverter case 51. The inverter case 51 has a stepped part 51a. The stepped part 51a is formed on the connection surface 51S. The stepped part 51a is recessed from the connection surface 51S. The motor case 43 has a stepped part 43a. The stepped part 43a projects from the connection surface 43S. The stepped part 43a fits into the stepped part 51a to form a so-called spigot type structure (inlay structure). The spigot structure facilitates the positioning of the inverter-side connection part 81 relative to the motor-side connection part 71. The stepped part 51a has a hole 51L in a bottom surface 51a1 of the stepped part 51a. The pin housing 72 and the receptacle housing 82 are inserted through the hole 51L. A groove 51b is formed in the bottom surface 51a1. The groove 51b surrounds the hole 51L. A loop-shaped packing 55 (third sealing member) is disposed in the groove 51b. When the stepped parts 43a, 51a are fitted into each other, a bottom surface 43a1 of the stepped part 43a compresses the packing 55. Water-tightness between the motor case 43 and the inverter case 51 is ensured by the compressed packing 55.

In the electric turbocharger 1, the inverter 5 is electrically connected to the electric motor 4 by the motor-side connection part 71 and the inverter-side connection part 81. The electric turbocharger 1 includes the packings 77 sandwiched between the pin housing 72 and the pins 73. The packings 77 maintain the water-tightness of the motor-side connection part 71. As a result, the movement of water through the motor-side connection part 71 is inhibited. The intrusion of water into the interior of the inverter 5 is thus suppressed.

The electric turbocharger 1 also has two other watertight structures in addition to the watertight structure above. The first watertight structure and the second watertight structure can reliably suppress the movement of gas and liquid from the electric motor 4 to the inverter 5. Additionally, the third watertight structure can reliably suppress the movement of gas and liquid from outside the electric turbocharger 1 to the interior of the inverter 5. As a result, the intrusion of gas and liquid into the interior of the inverter 5 can be reliably prevented.

It is to be understood that not all aspects, advantages and features described herein may necessarily be achieved by, or included in, any one particular example. Indeed, having described and illustrated various examples herein, it should be apparent that other examples may be modified in arrangement and detail. For example, the inverter integrated gas supply device may be applied to an electric turbocharger without a turbine.

In some of the examples illustrated and described herein, the motor-side connection part 71 has the pins 73 and the inverter-side connection part 81 has the receptacles 83. However, in other examples, the motor-side connection part 71 may have receptacles and the inverter-side connection part 81 may have pins.

The invention claimed is:

1. An inverter integrated gas supply device comprising:
an electric motor having a motor casing and configured to drive a fluid machine that discharges air;
an inverter having an inverter casing and configured to supply a drive current for controlling the number of rotations of the electric motor to the electric motor;
a motor-side connection part attached to the motor casing and configured to receive the drive current; and
an inverter-side connection part attached to the inverter casing, connected to the motor-side connection part, and configured to supply the drive current to the motor-side connection part,
wherein the motor-side connection part includes:
a motor-side connector housing fixed to the motor casing, wherein the motor-side connector housing has a hole forming an inner wall surface, wherein the inner wall surface includes a large diameter portion that is located between a first portion of the inner wall surface and a second portion of the inner wall surface, and wherein the large-diameter portion has a greater diameter relative to both the first portion and the second portion;
a motor connector disposed in the hole of the motor-side connector housing and configured to receive the drive current from the inverter-side connection part;
a sealing member configured to seal a gap that is formed by the large diameter portion of the hole, between the motor side connector housing and the motor connector.

2. The inverter integrated gas supply device according to claim 1,
wherein the sealing member is formed of an elastic resin material, and
wherein the motor connector is locked into position relative to the motor-side connector housing via the sealing member placed within the large diameter portion.

3. The inverter integrated gas supply device according to claim 1,
wherein the sealing member is a loop-shaped packing material mounted on the motor connector and contacting the inner wall surface of the motor-side connector housing at the large-diameter portion between the first portion and the second portion of the inner wall surface, and
wherein both the first portion and the second portion of the inner wall surface contact the motor connector.

4. The inverter integrated gas supply device according to claim 3,
wherein the motor connector comprises a plurality of pins,
wherein each of the plurality of pins has a pin distal end and a large diameter part forming a largest diameter of the pin, that is greater than an outer diameter of the pin distal end, and
wherein the packing material is mounted on the large diameter part of a corresponding pin.

5. The inverter integrated gas supply device according to claim 3,
wherein the motor-side connector housing includes a hollow distal end part into which the inverter-side connection part is inserted, and a solid intermediate part holding the motor connector, and
wherein the packing material is inserted to an inner surface of a hole formed in the intermediate part.

6. The inverter integrated gas supply device according to claim 1,
wherein the motor-side connector housing includes a body that houses the motor connector, and a flange having a bolt hole, and
wherein the flange is fixed to the motor casing by a bolt inserted through the bolt hole.

7. The inverter integrated gas supply device according to claim 1, wherein the inverter-side connection part includes an inverter-side connector housing fixed to the inverter casing, and an inverter connector disposed inside the inverter-side connector housing and configured to supply the drive current to the motor connector.

8. The inverter integrated gas supply device according to claim 7,
wherein a position of the motor connector relative to the motor-side connector housing is fixed, and
wherein a position of the inverter connector relative to the inverter-side connector housing is variable.

9. The inverter integrated gas supply device according to claim 8,
wherein the inverter-side connector housing includes a body that houses the inverter connector and a flange having a through hole, wherein a socket is inserted into the through hole, and
wherein a gap is formed between an outer circumferential surface of the socket and an inner circumferential surface of the through hole.

10. The inverter integrated gas supply device according to claim 9,
wherein the socket includes a socket body inserted into the through hole and a flange formed on one end of the socket body, and
wherein a gap is formed between a rear surface of the flange of the socket and a main surface of the flange of the inverter-side connector housing.

11. The inverter integrated gas supply device according to claim 1, further comprising a second sealing member configured to seal a gap between the motor casing and the motor-side connector housing.

12. The inverter integrated gas supply device according to claim 11,
wherein the motor-side connector housing includes a body that houses the motor connector, and a flange formed on the body,
wherein a hole having a bottom surface facing a main surface of the flange, is formed in a connection surface of the motor casing relative to the inverter casing,
wherein a loop-shaped groove surrounding the body is formed in the bottom surface of the hole, and
wherein the second sealing member is a loop-shaped packing material disposed in the groove.

13. The inverter integrated gas supply device according to claim 1, further comprising an additional sealing member configured to seal a gap between the motor casing and the inverter casing.

14. The inverter integrated gas supply device according to claim 13,
wherein the inverter casing includes a first stepped part recessed from a connection surface of the inverter casing relative to the motor casing,
wherein the motor casing includes a second stepped part projecting from the connection surface of the motor casing relative to the inverter casing and fitting into the first stepped part,
wherein a groove surrounding the inverter-side connection part is formed in a bottom surface of the first stepped part that faces the second stepped part of the motor casing, and
wherein the additional sealing member is a loop-shaped packing material disposed in the groove.

15. The inverter integrated gas supply device according to claim 1, further comprising:
a cooling part configured to cool the electric motor and the inverter;
a flow channel configured to supply cooling water to the cooling part; and
a cooling water connection structure connected to the flow channel and configured to supply and receive the cooling water.

16. The inverter integrated gas supply device according to claim 15, wherein the cooling water connection structure includes a first interface part formed on the motor casing, a second interface part formed on the inverter casing, and a packing material located between the first interface part and the second interface part.

17. The inverter integrated gas supply device according to claim 16, wherein the packing material is mounted on the second interface part so as to surround an opening of the flow channel.

18. The inverter integrated gas supply device according to claim 1, wherein the sealing member is a loop-shaped packing material configured to seal a gap formed between the pin and the motor-side connector housing.

* * * * *